United States Patent
Marchal et al.

(10) Patent No.: US 9,937,816 B2
(45) Date of Patent: Apr. 10, 2018

(54) METHOD FOR MANAGING THE TEMPERATURE OF A BATTERY OF AN ELECTRIC OR HYBRID VEHICLE

(71) Applicant: RENAULT S.A.S, Boulogne-Billancourt (FR)

(72) Inventors: Caroline Marchal, Montigny-le-Bretonneux (FR); Philippe Recouvreur, Montrogue (FR)

(73) Assignee: RENAULT S.A.S, Boulogne-Billancourt (FR)

( * ) Notice: Subject to any disclaimer, the term of this patent is extended or adjusted under 35 U.S.C. 154(b) by 181 days.

(21) Appl. No.: 14/787,365

(22) PCT Filed: Apr. 24, 2014

(86) PCT No.: PCT/FR2014/050996
§ 371 (c)(1),
(2) Date: Dec. 1, 2015

(87) PCT Pub. No.: WO2014/177793
PCT Pub. Date: Nov. 6, 2014

(65) Prior Publication Data
US 2016/0082860 A1    Mar. 24, 2016

(30) Foreign Application Priority Data
Apr. 30, 2013 (FR) .................... 13 54015

(51) Int. Cl.
*H02J 7/00* (2006.01)
*B60L 11/18* (2006.01)
(Continued)

(52) U.S. Cl.
CPC ....... *B60L 11/1872* (2013.01); *B60L 11/1861* (2013.01); *B60L 11/1874* (2013.01);
(Continued)

(58) Field of Classification Search
USPC ................................. 320/126–136
See application file for complete search history.

(56) References Cited

U.S. PATENT DOCUMENTS

| | | | |
|---|---|---|---|
| 2009/0139781 A1* | 6/2009 | Straubel | B60L 11/1875 180/65.1 |
| 2010/0072954 A1* | 3/2010 | Kohn | H02J 7/0091 320/152 |

(Continued)

FOREIGN PATENT DOCUMENTS

JP    2012-104458 A    5/2012

OTHER PUBLICATIONS

International Search Report dated Jul. 2, 2014 for PCT/FR2014/050996 filed Apr. 24, 2014.

(Continued)

*Primary Examiner* — Bihn Tat
(74) *Attorney, Agent, or Firm* — Oblon, McClelland, Maier & Neustadt, L.L.P.

(57) ABSTRACT

A method for managing the temperature of a battery of an electric or hybrid vehicle includes recording a temperature value at which the cooling or heating of the battery is triggered. The method further includes, for two consecutive values in a predefined sequence of states of charge: a step of comparing a real gradient to a reference gradient of the battery temperature; and a step of modifying, depending on the comparison, the value of the trigger temperature, or the value of the power output by cooling or heating the battery; and also includes applying the modified trigger temperature or output power for the following two consecutive values of the state of charge of the battery in the predefined sequence.

12 Claims, 1 Drawing Sheet

(51) Int. Cl.
*H01M 10/625* (2014.01)
*H01M 10/633* (2014.01)

(52) U.S. Cl.
CPC ....... *B60L 11/1875* (2013.01); *H01M 10/625* (2015.04); *H01M 10/633* (2015.04); *B60L 2240/545* (2013.01); *B60L 2260/44* (2013.01); *Y02T 10/705* (2013.01); *Y02T 10/7005* (2013.01); *Y02T 10/7044* (2013.01)

(56) References Cited

U.S. PATENT DOCUMENTS

2011/0018491 A1    1/2011   Yoshida et al.
2012/0025762 A1*   2/2012   Lienkamp ............. B60L 3/0046
                                                320/109

OTHER PUBLICATIONS

French Search Report dated Jan. 14, 2014 for French 1354015 filed Apr. 30, 2013.

* cited by examiner

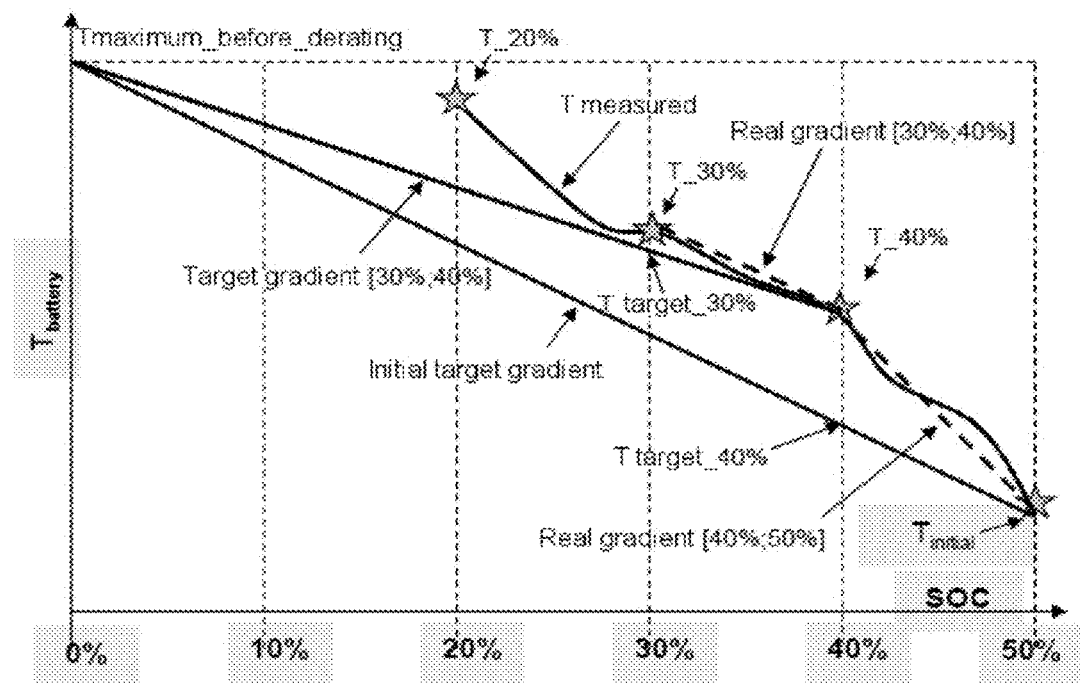

METHOD FOR MANAGING THE TEMPERATURE OF A BATTERY OF AN ELECTRIC OR HYBRID VEHICLE

BACKGROUND

The present invention relates to the field of thermal regulation of a battery for a motor vehicle, in particular a rechargeable electric or hybrid vehicle (PHEV for plug-in hybrid electric vehicle), of which the batteries can be charged by hooking up to an external energy source at different types of charging points, usually connected to a conventional electrical network.

For this type of vehicle, the performance of a battery is very sensitive to the usage temperature thereof. The usage temperature of a battery is dependent on the external temperature, but also on other parameters, such as the driving of the driver, for example.

At low temperature, a battery is weak. In other words, during a charge phase, the charge time of said battery is longer and it charges less energy; and during a discharge phase, the autonomy of the battery is lower and the performance of said battery is reduced (in this case, a battery has in particular low power absorption capacities in the case of regenerative braking).

At high temperature, the battery demonstrates an improved performance compared with that at low temperature (improved charge time, more stored energy, improved recovery of energy), but at the detriment to its service life, which is reduced.

It is therefore important to manage the transfers of heat, in other words the thermal properties of a battery, in order to be able to use said battery in its optimal zone of operation.

In order to manage the thermal properties of a battery, the current prior art solutions consist of using temperature thresholds that are constant over time for the triggering and stopping of the cooling/heating. For example, the cooling can be triggered on the basis of a temperature of the battery greater than 28° C., and this cooling can be stopped as soon as the temperature of the battery reaches 15° C.

Document U.S. Pat. No. 6,624,615 is also known and discloses a method for managing the temperature of a battery of an electric vehicle, in which the temperature thresholds that make it possible to determine whether it is necessary to cool or to heat the battery vary with the state of charge thereof. A disadvantage of this solution is that the thresholds are constant over time, i.e. are independent of the driving manner. Consequently, they may lead to an overconsumption when the driver adopts a gentle driving manner and may lead to an overheating when the driver adopts a harsh driving manner.

BRIEF SUMMARY

More precisely, the invention firstly relates to a method for managing the temperature of a battery of an electric or hybrid vehicle,
comprising:
a step of recording in a memory a temperature value (Ts) at which the cooling or the heating of the battery is triggered.
The method is essentially characterized in that it comprises, for two consecutive values of the state of charge of the battery (SOC(i), SOC(i−x)) in a predefined sequence:
a step of comparing the value of a real gradient ((dT/dSOC)_real) of the temperature of the battery to a reference gradient ((dT/dSOC)_target) of the temperature of the battery; and
a step of modifying, depending on the result of the step of comparison,
the temperature value (Ts) at which the cooling or the heating of the battery is triggered; or
the value of the power delivered by means for cooling or heating the battery;
and in that the method comprises a step including
applying the modified trigger temperature value (Ts) or the modified delivered power value for the following two consecutive values of the state of charge of the battery (SOC(i−x), SOC(i−2x)) in the predefined sequence.

In one embodiment, a step of initialization is also provided, in which the value of the initial reference gradient (dT/dSOC)_target is stored beforehand in a map installed onboard the vehicle, or is determined as follows:

$$\left(\frac{dT}{dSOC}\right)\_target = \frac{T_{maximum\_before\_derating} - T_{initial}}{SOC_{initial} - SOC_{end\_of\_discharge}} \quad (1)$$

with $T_{maximum\_before\_derating}$ the maximum usage temperature of the battery corresponding to the acceptable limit of discharge or regenerative braking power, beyond which the available power decreases;

$T_{initial}$ the temperature of the battery at the time of implementation of the step of initialization;

$SOC_{initial}$ the state of charge of the battery at the time of implementation of the step of initialization; and $SOC_{end\_of\_discharge}$ the state of charge of the battery corresponding to the end of discharge or to the state of minimal charge usable by the battery.

In one embodiment, a step is provided that includes defining the value of the reference gradient (dT/dSOC)(i)_target for a state of charge value (SOC(i)) given by the equation:

$$\left(\frac{dT}{dSOC}\right)(i)\_target = \frac{T_{maximum\_before\_derating} - T_{SOC(i)}}{SOC(i) - SOC_{end\_of\_discharge}};$$

with $T_{maximum\_before\_derating}$ the maximum usage temperature of the battery corresponding to the acceptable limit of discharge or regenerative braking power, beyond which the available power decreases;

$T_{SOC(i)}$ the value of the temperature of the battery measured at the state of charge SOC(i);

$SOC_{end\_of\_discharge}$ the state of charge of the battery corresponding to the end of discharge or to the state of minimal charge usable by the battery.

In one embodiment, the step of comparison comprises the calculation of a difference E, in absolute value, between the gradient (dT/dSOC)_real and the reference gradient (dT/dSOC)_target between said consecutive values of the state of charge of the battery (SOC(i), SOC(i−x)) in the predefined sequence.

In one embodiment, a step is provided that includes determining the driving type or the driving manner of the driver.

In one embodiment if E>0, the driving type is considered to be harsh; and if E<0, the driving type is considered to be normal or gentle.

In one embodiment, when the driving type is considered to be harsh, a step is provided that includes decreasing the value of the trigger threshold temperature (Ts) recorded for two consecutive values of the state of charge of the battery (SOC(i), SOC(i−x)) in a predefined sequence, and applying the reduced value of the trigger temperature (Ts) for the following two consecutive values of the state of charge of the battery (SOC(i−x), SOC(i−2x)) in the predefined sequence.

In one embodiment, a reduced value ($T_{new\ client\ trigger\ threshold}$) of the trigger temperature is calculated in accordance with the equation:

$$T_{new\ client\ trigger\ threshold} = T_{old\ trigger\ threshold} - Kp \cdot \frac{dSOC}{dt} \cdot \varepsilon$$

with the term Kp a constant term; and $T_{old\ client\ trigger\ threshold}$ the value of the trigger temperature not yet reduced.

In one embodiment, a step is provided that includes increasing the value of the recorded threshold temperature $T_{old\ trigger\ threshold}$ such that the cooling of the battery is triggered later.

The invention also relates to a computer program, comprising program code instructions for the execution of the steps of the method according to the invention, when said program is executed on a computer.

BRIEF DESCRIPTION OF THE DRAWINGS

Further features and advantages of the present invention will become clearer upon reading the following description, which is given by way of non-limiting and illustrative example with reference to the sole FIGURE, which shows the development of the temperature of the battery and also examples of target gradient and real gradient depending on the state of charge of the battery.

DETAILED DESCRIPTION

For brevity, the term "motor vehicle" means any electric or hybrid motor vehicle.

Each motor vehicle comprises at least one battery, hereinafter "a" or "the" battery.

Each motor vehicle comprises means for cooling or heating the battery, hereinafter a "thermal system".

The state of charge SOC of the battery is typically expressed in percentages of charging, 100% corresponding to a battery charged to the maximum of its capacity and 0% corresponding to a discharged battery.

In the management of the temperature of a battery of a motor vehicle presented here, it is aimed to regulate:

the temperature Ts at which the cooling or the heating of the battery by the thermal system is triggered; or the power delivered by the thermal system, for example via the ventilation flow or temperature.

The trigger threshold temperature Ts is recorded in a memory. When the real temperature of the battery crosses this threshold temperature Ts, the cooling or possibly the heating of the battery is triggered.

In order to optimize these trigger temperature values Ts or delivered power values and consequently optimize the operation and the service life of the battery, the steps described hereinafter are provided, with reference to a reference gradient—or target gradient—(dT/dSOC)_target, of which the value is variable and is recorded in a memory, preferably onboard the vehicle, where T is the temperature of the battery, dT is the development of the temperature of the battery, SOC is the state of charge of the battery, and dSOC is the development of the state of charge of the battery.

Initialization

At the time of initialization of the method, for example as the vehicle is started, the value of the reference gradient (dT/dSOC)_target may be provided onboard the vehicle beforehand as a map. The value thereof may be dependent on different parameters, for example the external temperature, the country of use of the vehicle, topography, temperature and state of charge of the battery at the time of initialization, etc.

The initial reference gradient (dT/dSOC)_target can also be determined at the time of initialization in the following manner:

$$\left(\frac{dT}{dSOC}\right)\_target = \frac{T_{maximum\_before\_derating} - T_{initial}}{SOC_{initial} - SOC_{end\ of\ discharge}} \quad (1)$$

with $T_{maximum\_before\_derating}$ the maximum usage temperature of the battery corresponding to the acceptable limit of discharge (and/or regenerative braking), beyond which the available power decreases;

$T_{initial}$ the temperature of the battery at the time of implementation of the step of initialization;

$SOC_{initial}$ the state of charge of the battery at the time of implementation of the step of initialization;

$SOC_{end\_of\_discharge}$ the state of charge of the battery corresponding to the end of discharge (state of minimal charge usable by the battery).

In the sole FIGURE, the initial target gradient is the line connecting the point of measurement of the initial temperature Tinitial and the maximum temperature Tmaximum_before_derating.

Operation

During operation, the temperature T of the battery is measured and the development dT of the temperature of the battery is determined on the basis of the development dSOC of the state of charge thereof. The real gradient (dT/dSOC)_real is then determined.

The temperature of the battery is typically measured by an assembly of at least one sensor integrated in the battery. The state of charge SOC of the battery is permanently known, by means known to a person skilled in the art.

It may be that the battery is cooled as soon as it is detected that the real gradient is greater than the reference gradient.

It may also be that an intermediate step is performed in which a trigger temperature value or a value of the power delivered by heating/cooling means is modified as described below.

A predefined sequence of state of charge values SOC is defined: SOC(i), SOC(i−x), SOC(i−2x), . . . , SOC(i−Nx); x defining a step value, which is preferably constant, and N defining a natural number.

For example, the step x is between 5% and 15%, and in this case is 10%. The temperature of the battery is measured at the minimum with each step, i.e. at each value SOC(i) of the predefined sequence, or continuously.

At the time of initialization, see equation (1) above:

SOC(i)=SOC$_{initial}$ is less than or equal to 100%, in the present case 50% in the sole FIGURE.

At the maximum, the value of N is selected such that SOC(i−Nx)=SOC$_{end\_of\_discharge}$ for example 0%.

During operation, the values T(i) of the temperature of the battery for a given state of charge value SOC(i) are recorded in a memory, at least for each value of the sequence SOC(i), SOC(i−x), SOC(i−2x), . . . , SOC(i−Nx).

Two immediately consecutive state of charge values of a step x: [SOC(i); SOC(i−x)], [SOC(i−x); SOC(i−2x)], etc. define a cycle C.

For a given cycle C(i; i−x) between SOC(i) and SOC(i−x), it is then possible:

to calculate the real temperature difference $dT\_real = T(i-x) - T(i)$;

and to calculate the real state of charge difference $dSOC\_real = SOC(i-x) - SOC(i)$.

The real gradient (dT/dSOC)_real=dT_real/dSOC_real may then be calculated by a computer.

Thanks to the computer, it is then possible to compare the gradient (dT/dSOC)_real to the reference gradient (dT/dSOC)_target in order to determine the type of driving, as described below.

For a given value of the state of charge SOC(i), the value of the reference gradient (dT/dSOC)_target can then be indexed by the index (i) and can be written (dT/dSOC)(i)_target, the value thereof being given, with reference to equation (1), by the equation:

$$\left(\frac{dT}{dSOC}\right)(i)\_target = \frac{T_{maximum\_before\_derating} - T_{SOC(i)}}{SOC(i) - SOC_{end\_of\_discharge}} \quad (2)$$

The value of the reference gradient (dT/dSOC) (i)_target can be calculated at any moment of the given cycle C(i; i−x) between SOC(i) and SOC(i−x), preferably at the start of the cycle.

The value of the reference gradient (dT/dSOC) (i)_target is variable and calculated with each cycle, which makes it possible to determine the type of driving closest to the actual situation.

In the sole FIGURE, a real gradient "Real gradient [40%;50%]" is illustrated by a dashed line between the state of charge 50%, for which the measured temperature is the initial temperature Tinitial, and the state of charge 40%, for which the measured temperature is the temperature T_40%.

Likewise, a real gradient "real gradient [30%;40%]" is illustrated by a dashed line between the state of charge 30%, for which the measured temperature is the initial temperature T_30%, and the state of charge 40%, for which measured temperature is the temperature T_40%.

A target gradient "target gradient [30%;40%]" is illustrated by the line connecting the point of measurement of the initial temperature T_40% and the maximum temperature Tmaximum_before_derating.

Determination of the Driving Type

A step of learning is provided, consisting of determining the driving type or the driving manner of the driver, preferably with each cycle, with the possible exception of the first cycle after the initialization.

The step of comparison of the gradient (dT/dSOC)_real to the reference gradient (dT/dSOC)_target of the same cycle is implemented, after the initialization, for at least one cycle and preferably with each cycle.

In the present case, the step of comparison comprises the calculation of the difference E, in absolute value, between the gradient (dT/dSOC)_real and the reference gradient (dT/dSOC)_target of the same cycle. For improved readability, the indices (i) are thus ignored, and the difference E can be written:

$E = ABS[(dT/dSOC)\_real] - ABS[(dT/dSOC)\_target]$ with ABS the absolute value.

Depending on the mathematical sign of E, it is possible to determine the driving type or the driving manner of the driver. In the present case if E>0, the driving type is considered harsh; and if E<0, the driving type is considered normal or gentle.

Harsh Driving

In the case of harsh driving, at least one of the two following configurations may be provided.

In a first configuration, the power of the means for cooling the battery is regulated. In this first configuration, the regulator may be a PID.

In a second configuration, the threshold temperature at which the heating/cooling of the battery is triggered is regulated.

In this second configuration, the value of the trigger threshold temperature is typically lowered for the following cycle, such that the cooling of the battery is triggered earlier.

For example, the value of the recorded trigger threshold temperature is decreased for a given cycle C(i; i−x) by a value between 1° C. and 5° C., and typically by 2° C. or 3° C., so as to obtain a new trigger threshold temperature value recorded and used for the following cycle C(i−x; i−2x). The value by which the trigger threshold temperature value is decreased can be recorded in a memory and may be constant or variable and be dependent on a certain number of parameters.

In this second configuration, the regulator may operate as follows:

The equation governing the development of the target temperature of the battery is defined as being:

$$MCp\frac{dT_{target}}{dt} = RI^2_{theoretical} + \phi_{external} + hS \cdot (T_{coolant} - T_{target}) \quad (1)$$

where $T_{target}$ is the target temperature of the battery corresponding to the target gradient; i.e. for a given cycle C(i; i−x), the value of the temperature T(i−x) of the target gradient, see the sole FIGURE;

$\phi_{external}$ designates the power exchanged between the battery and the ambient air;

$hS(T_{coolant} - T_{target})$ designates the convection term associated with the cooling system. This term is zero when the temperature of the battery T_target is lower than the threshold temperature at which cooling is triggered, i.e. when the cooling of the battery is inactive;

$T_{coolant}$ designates the temperature of the cooling fluid of the cooling system;

$RI^2_{theoretical}$ designates the term for generation of theoretical heat within the battery; and MCp designates the inertia term of the battery.

In real conditions, the equation governing the temperature of the battery is as follows:

$$MCp\frac{dT_{real}}{dt} = RI_{real}^2 + \phi_{external} + hS \cdot (T_{coolant} - T_{real}) \quad (2)$$

with, in relation to equation (1):
$T_{real}$ the measured temperature; and
$RI_{real}^2$ the term for generation of real heat within the battery.

On the assumption that the term $\Delta RI^2 RI_{real}^2 - RI_{theoretical}^2$ (which corresponds to an over-severity of the behavior of the driver compared with the target behavior) is compensated by the term $hS \cdot (T_{old\ trigger\ threshold} - T_{new\ client\ trigger\ threshold})$, it is possible to combine equations (1) and (2) and to show that $$MCp\left(\frac{dT_{real}}{dt} - \frac{dT_{target}}{dt}\right) = \quad (3)$$
$$\Delta RI^2 = hS \cdot (T_{old\ trigger\ threshold} - T_{new\ client\ trigger\ threshold})$$

with
$T_{new\ client\ trigger\ threshold}$ the value of the threshold temperature Ts for a given cycle; and
$T_{old\ trigger\ threshold}$ the value of the threshold temperature Ts for the previous cycle.

By introducing into equation (3) the term E defined previously by $$\varepsilon = \left(\frac{dT_{real}}{dSOC} - \frac{dT_{target}}{dSOC}\right),$$

it can be deduced that $$T_{new\ client\ trigger\ threshold} = T_{old\ trigger\ threshold} - \frac{MCp}{hS} \cdot \frac{dSOC}{dt} \cdot \varepsilon \quad (4)$$

Assuming that the regulation of the trigger threshold temperature Ts does not change the flow of the cooling, it is possible to consider that the coefficient of convection h is constant. Under these conditions, equation (4) is written as follows:

$$T_{new\ client\ trigger\ threshold} = T_{old\ trigger\ threshold} - Kp \cdot \frac{dSOC}{dt} \cdot \varepsilon \quad (5)$$

The term Kp designates a constant term which makes it possible to adjust the regulator.

In the sole FIGURE, the target temperature "Ttarget_30%" illustrates the value of the target gradient "Target gradient [30%;40%]" for a state of charge of 30%. Similarly, the target temperature "Ttarget_40%" is the value of the target gradient "Target gradient [40%;50%]", in the present case the "Initial target gradient", for a state of charge of 40%.

Gentle Driving

In the case of normal or gentle driving, a consistent configuration for regulating the threshold temperature $T_{old\ trigger\ threshold}$ at which the cooling of the battery is triggered is provided.

In this configuration, the value of the recorded threshold temperature $T_{old\ trigger\ threshold}$ is increased, such that the cooling of the battery is triggered later. For example, the value of the threshold temperature is increased by a value between 1° C. and 5° C., and typically by 2° C., so as to obtain a new threshold temperature $T_{new\ client\ trigger\ threshold}$. The value of the threshold temperature thus modified $T_{new\ client\ trigger\ threshold}$ is used for the following cycle.

Once the driving type has been determined, a regulator makes it possible to control or regulate:
the temperature at which the cooling or the heating of the battery is triggered; or
the power delivered by the means for cooling or heating the battery, for example via the ventilation flow or temperature.

The value of the trigger temperature Ts or of the delivered power determined for a given cycle C(i; i–x) is applied to the following cycle C(i–x; i–2x).

The step of learning can be implemented iteratively with each cycle whilst the motor vehicle is in operation, until the engine of said vehicle is stopped.

Since the reference gradient (dT/dSOC)_target is calculated with each cycle, the management of the temperature of the battery of the motor vehicle is adapted to each driver and to the driving conditions of said driver.

Thanks to the invention, it is possible to modify the threshold at which the cooling of the battery is triggered so as to adapt to the real driving behavior of the driver.

It will be noted that equations (1) and (2) make reference to the maximum value $T_{maximum\_before\_derating}$. Alternatively, it is possible to choose, as maximum temperature Tmax, a temperature that is distanced and of which the value is predetermined and constant in relation to $T_{maximum\_before\_derating}$, for example $T\text{max} = T_{maximum\ before\ derating} - T\_\text{secure}$, where T_secure=1° C. or 2° C.

Lastly, it will be noted that the regenerative braking systems may be omitted.

The invention claimed is:

1. A method for managing a temperature of a battery of an electric or hybrid vehicle, comprising:
recording in a memory a temperature value at which cooling or heating of the battery is triggered;
performing, for two consecutive values of a state of charge of the battery in a predefined sequence:
comparing a value of a real gradient of the temperature of the battery to a reference gradient of the temperature of the battery, and
modifying, depending on a result of the comparing,
the temperature value at which the cooling or the heating of the battery is triggered, or
a value of power delivered by means for cooling or heating the battery; and
applying the modified trigger temperature value or the modified delivered power value for the following two consecutive values of the state of charge of the battery in the predefined sequence,
wherein the reference gradient of the temperature of the battery is variable and is calculated when the performing is done for a first of the two consecutive values of the state of charge of the battery and then is calculated again when the performing is done for a second of the two consecutive values of the state of charge of the battery.

2. The method as claimed in claim 1, further comprising: initializing, including storing a value of an initial reference gradient beforehand in a map installed onboard the vehicle, or determining the value of the initial reference gradient as follows:

$$\left(\frac{dT}{dSOC}\right)_{target} = \frac{T_{maximum\_before\_derating} - T_{initial}}{SOC_{initial} - SOC_{end\_of\_discharge}}$$

With $T_{maximum\_before\_derating}$ being a maximum usage temperature of the battery corresponding to the acceptable limit of discharge or regenerative braking power, beyond which available power decreases;

$T_{initial}$ being the temperature of the battery at a time of implementation of the initializing;

$SOC_{initial}$ being the state of charge of the battery at the time of implementation of the initializing; and $SOC_{end\_of\_discharge}$ being the state of charge of the battery corresponding to an end of discharge or to a state of minimal charge usable by the battery.

3. The method as claimed in claim 1, further comprising: defining the value of the reference gradient for a state of charge value given by the equation:

$$\left(\frac{dT}{dSOC}\right)(i)_{target} = \frac{T_{maximum\_before\_derating} - T_{SOC(i)}}{SOC(i) - SOC_{end\_of\_discharge}};$$

With $T_{maximum\_before\_derating}$ being a maximum usage temperature of the battery corresponding to the acceptable limit of discharge or regenerative braking power, beyond which available power decreases;

$T_{SOC(i)}$ being the value of the temperature of the battery measured at the state of charge SOC(i); and $SOC_{end\_of\_discharge}$ being the state of charge of the battery corresponding to an end of discharge or to a state of minimal charge usable by the battery.

4. The method as claimed in claim 1, wherein the comparing comprises calculation of a difference E, in absolute value, between the gradient and the reference gradient between said consecutive values of the state of charge of the battery in the predefined sequence.

5. The method as claimed in claim 1, further comprising: determining driving type or driving manner of a driver.

6. The method as claimed in claim 4, wherein
if E>0, a driving type is considered to be harsh; and
if E<0, the driving type is considered to be normal or gentle.

7. The method as claimed in claim 6, further comprising: decreasing, when the driving type is harsh, the value of the trigger temperature recorded for two consecutive values of the state of charge of the battery in a predefined sequence, and
applying the decreased value of the trigger temperature for the following two consecutive values of the state of charge of the battery in the predefined sequence.

8. The method as claimed in claim 7, wherein a reduced value of the trigger temperature is calculated in accordance with the equation:

$$T_{new\ client\ trigger\ threshold} = T_{old\ trigger\ threshold} - Kp \cdot \frac{dSOC}{dt} \cdot \varepsilon$$

with the term Kp being a constant term; and $T_{old\ trigger\ threshold}$ being a value of the trigger temperature not yet reduced.

9. The method as claimed in claim 8, further comprising: increasing a value of a recorded threshold temperature $T_{old\ trigger\ threshold}$ such that the cooling of the battery is triggered later when the driving type is considered to be normal or gentle.

10. A non-transitory computer readable medium, comprising program code instructions for execution of the method as claimed in claim 1, when said program is executed on a computer.

11. A method for managing a temperature of a battery of an electric or hybrid vehicle, comprising:
recording in a memory a temperature value at which cooling or heating of the battery is triggered;
performing, for two consecutive values of a state of charge of the battery in a predefined sequence:
comparing a value of a real gradient of the temperature of the battery to a reference gradient of the temperature of the battery, and
modifying, depending on a result of the comparing, the temperature value at which the cooling or the heating of the battery is triggered, or
a value of power delivered by means for cooling or heating the battery;
applying the modified trigger temperature value or the modified delivered power value for the following two consecutive values of the state of charge of the battery in the predefined sequence; and
initializing, including storing the value of an initial reference gradient beforehand in a map installed onboard the vehicle, or determining the value of the initial reference gradient as follows:

$$\left(\frac{dT}{dSOC}\right)_{target} = \frac{T_{maximum\_before\_derating} - T_{initial}}{SOC_{initial} - SOC_{end\_of\_discharge}}$$

With $T_{maximum\_before\_derating}$ being a maximum usage temperature of the battery corresponding to the acceptable limit of discharge or regenerative braking power, beyond which the available power decreases, $T_{initial}$ being the temperature of the battery at a time of implementation of the initializing;

$SOC_{initial}$ being the state of charge of the battery at the time of implementation of the initializing; and $SOC_{end\_of\_discharge}$ being the state of charge of the battery corresponding to the end of discharge or to the state of minimal charge usable by the battery.

12. A method for managing a temperature of a battery of an electric or hybrid vehicle, comprising:
recording in a memory a temperature value at which cooling or heating of the battery is triggered;
performing, for two consecutive values of a state of charge of the battery in a predefined sequence:
comparing a value of a real gradient of the temperature of the battery to a reference gradient of the temperature of the battery, and
modifying, depending on the result of the comparing, the temperature value at which the cooling or the heating of the battery is triggered, or
a value of power delivered by means for cooling or heating the battery;

applying the modified trigger temperature value or the modified delivered power value for the following two consecutive values of the state of charge of the battery in the predefined sequence; and defining the value of the reference gradient for a state of charge value given by the equation:

$$\left(\frac{dT}{dSOC}\right)(i)\_target = \frac{T_{maximum\_before\_derating} - T_{SOC(i)}}{SOC(i) - SOC_{end\_of\_discharge}};$$

With $T_{maximum\_before\_derating}$ being a maximum usage temperature of the battery corresponding to the acceptable limit of discharge or regenerative braking power, beyond which available power decreases;

$T_{SOC(i)}$ being the value of the temperature of the battery measured at a state of charge SOC(i); and $SOC_{end\_of\_discharge}$ being the state of charge of the battery corresponding to an end of discharge or to a state of minimal charge usable by the battery.

* * * * *